United States Patent
Monde et al.

(10) Patent No.: US 6,728,634 B2
(45) Date of Patent: Apr. 27, 2004

(54) DESTINATION ROUTE GUIDING METHOD

(75) Inventors: Yasuhiro Monde, Tokyo (JP); Kazuya Tabata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/221,855

(22) PCT Filed: Jan. 29, 2001

(86) PCT No.: PCT/JP01/00581
§ 371 (c)(1),
(2), (4) Date: Sep. 17, 2002

(87) PCT Pub. No.: WO02/061377
PCT Pub. Date: Aug. 8, 2002

(65) Prior Publication Data
US 2003/0033080 A1 Feb. 13, 2003

(51) Int. Cl.[7] .............................................. G01C 21/32
(52) U.S. Cl. .................. 701/209; 701/201; 340/988
(58) Field of Search .................. 701/209, 208, 701/200, 201, 202, 207; 340/988, 540

(56) References Cited

U.S. PATENT DOCUMENTS 6,374,183 B1 * 4/2002 Oshida et al. .............. 701/211
2001/0011207 A1 * 8/2001 Inoue et al. ................ 701/213
2002/0129020 A1 * 9/2002 Nomura ......................... 707/6

FOREIGN PATENT DOCUMENTS

| JP | 10-185602 A | 7/1998 |
| JP | 10-185604 A | 7/1998 |
| JP | 11-083521 A | 3/1999 |
| JP | 2000-018956 A | 1/2000 |
| JP | 2000-321085 A | 11/2000 |
| JP | 2000-337899 A | 12/2000 |

* cited by examiner

*Primary Examiner*—Marthe Y. Marc-Coleman
(74) *Attorney, Agent, or Firm*—Birch, Stewart, Kolasch & Birch, LLP

(57) ABSTRACT

A destination navigation method is disclosed, which includes locating present position and destination, searching route to the destination. The method includes giving driving guidance along a route set on basis of a predetermined evaluation index or selection of driver and further determining whether searched route contains a short distance lane change section, where a road having many lanes and distance between an entryway to the road having many lanes and a junction (exit way) is short in order to give notice that it is coming and for driver to avoid it if necessary because the short distance lane change section may cause stress and fatigue especially for an unskilled driver.

7 Claims, 6 Drawing Sheets

DESTINATION ROUTE GUIDING METHOD

This application is the national phase under 35 U.S.C. §371 of PCT International Application No. PCT/JP01/00581 which has an International filing date of Jan. 29, 2001, which designated the United States of America.

TECHNICAL FIELD

The present invention relates to a destination navigation method used for an in-vehicle navigation system for giving a driving guidance along a route to a set designation (hereinafter referred to as a routing line to destination) and, in particular, to a destination navigation method in a case when the routing line to destination has a section requiring a lane change.

BACKGROUND ART

FIG. 1 is an illustration to show a destination navigation method in the prior art, for example, disclosed in Japanese Patent Laid Open Publication No. 2000-18956. As shown in FIG. 1, when a routing line to destination for connecting the present position to a destination is set in a navigation system, every time a vehicle comes near to a branch point (hereinafter referred to as a guide branch point) where a guidance is given to a driver along the routing line to destination, a driving guidance relating to the guide branch point is given, for example, by means of voice. In this case, for example, a distance to the guide branch point and a direction to turn such as "xxx meter ahead, Turn to the right" are announced by voice. Further, as shown in FIG. 1, not only the distance to the guide branch point but also the position of lane to pass such as "xxx meter ahead, To xxxx, Go to right end lane" is announced by voice.

Since the destination navigation method used in the navigation system in the prior art gives the driver the driving guidance in the manner described above, even in the case when the routing line to destination has a section requiring a lane change, it gives the driver only a guidance of the lane to pass at an every predetermined appropriate timing when the vehicle comes near to the guide branch point. However, in a case when there is a road having many lanes on the routing line to destination and the vehicle is driven along the routing line to destination, if a distance for an entryway or a junction (exit way) is short to/from a highway having many lanes along the routing line to destination, it is necessary to make a large lane change in a short distance but, even in this case, as described above, the destination navigation method in the prior art does not give a special alarm but only gives an appropriate guidance of a lane change. Therefore, the destination navigation method in the prior art requires the driver to make a large lane change in a short time without informing the driver of the necessary large lane change, in advance, which presents a problem of raising the possibility that the driver, in particular, an unskilled driver who gets a driving license a short time ago, is given a mental fatigue and is uselessly tired in driving.

Further, when the driver searches a route from the present position of the vehicle to the destination, the destination navigation method in the prior art uses a travel distance, a driving time, expenses including a highway toll (hereinafter referred to as a cruising toll) as evaluation indexes for selecting the routing line to destination, but does not take into account whether or not the routing line to destination includes a section requiring the driver to make a large lane change in a short distance (hereinafter referred to as a short-distance lane change section) in performing a search for the routing line to destination. Therefore, the destination navigation method in the prior art presents a problem that it can not respond to the request of the driver who desires to avoid such a short-distance lane change section.

The present invention has been made to solve the problem described above, and it is an object of the present invention to provide a destination navigation method for informing or warning a driver that the vehicle is coming near to the short-distance lane change section at the time when a vehicle comes near to a short-distance lane change section.

Further, it is another object of the present invention to provide a destination navigation method for judging whether or not a set routing line to destination includes a short-distance lane change section and for changing the set routing line to destination to a bypath including no short-distance lane change section according to the selection of a driver.

DISCLOSURE OF THE INVENTION

A destination navigation method in accordance with the present invention includes a step of judging whether or not one searched route or a plurality of searched routes include a short-distance lane change section.

This makes it possible to set a routing line to destination on the basis of the presence or absence of the short-distance lane change section, and thus can produce an effect of responding to the request of a driver to desire to bypass the short-distance lane change section.

The destination navigation method in accordance with the present invention further includes a step of making the driver select whether or not the driver avoids passing the short-distance lane change section.

This make it possible to reflect a driver's intention of avoiding or accepting passing the short-distance lane change section to the setting of the routing line to destination, and thus can produce an effect of setting the routing line to destination in accordance with the driver's intention.

The destination navigation method in accordance with the present invention further includes a step of judging whether or not one route or a plurality of routes among the routes for connecting the present position to the destination include the short-distance lane change section and a step of making the driver select whether or not the driver avoids passing the short-distance lane change section only in the case when the route is judged as including the short-distance lane change section.

This makes it possible urging the driver to select the route only in the case when the route having a possibility of being set as the routing line to destination includes the short-distance lane change section and thus can produce an effect of eliminating the need for asking an unnecessary selection of the driver and of improving the convenience of a navigation system.

The destination navigation method in accordance with the present invention further includes a step of judging whether or not one route or the plurality of routes for connecting the present position to the destination have an appropriate route including no short-distance lane change section.

Thereby, in the case when the driver desires to avoid passing the short-distance lane change section, if an appropriate route including no short-distance lane change section is found, it is possible to automatically set the route as the routing line to destination, and thus to produce an effect of setting the routing line to destination that the driver desires without asking an unnecessary selection of the driver.

The destination navigation method in accordance with the present invention further includes a step of informing the driver that there is the short-distance lane change section on the routing line to destination in a case when the set routing line to destination includes the short-distance lane change section, by an use of image information or voice information.

Thereby, it make possible for the driver to recognize in advance that the driver passes a route including the short-distance lane change section and thus to produce an effect of making the driver prepare driving for passing the short-distance lane change section and of reducing the mental fatigue of the driver.

The destination navigation method in accordance with the present invention further includes a step by which the driver is given an alarm or a driving guidance relating to the short-distance lane change section every time the driver comes near to the short-distance lane change section in the case when the set routing line to destination includes the short-distance lane change section.

Thereby, it makes possible to call a driver's attention before the driver passes the short-distance lane change section and thus to produce an effect of improving safety in driving a vehicle.

The destination navigation method in accordance with the present invention further includes a step of displaying one route or a plurality of routes including a short-distance lane change section and one route or a plurality of routes including no short-distance lane change section in such a manner that they can be discriminated from each other, and a step of making the driver select one route out of the plurality of routes displayed in the said displaying step.

Thereby, even in the case when the route including no short-distance lane change section is judged as being not appropriate, the route can be set as the routing line to destination by the selection of the driver, and it is possible to produce an effect of expanding the alternatives of cruising routes and improving the effectiveness of the navigation system.

BEST MODE FOR CARRYING OUT THE INVENTION

In order to be understood the present invention in more detail, the best modes for carrying out the present invention will be hereinafter described with reference to accompanying drawings.

Embodiment 1

Figure 1:
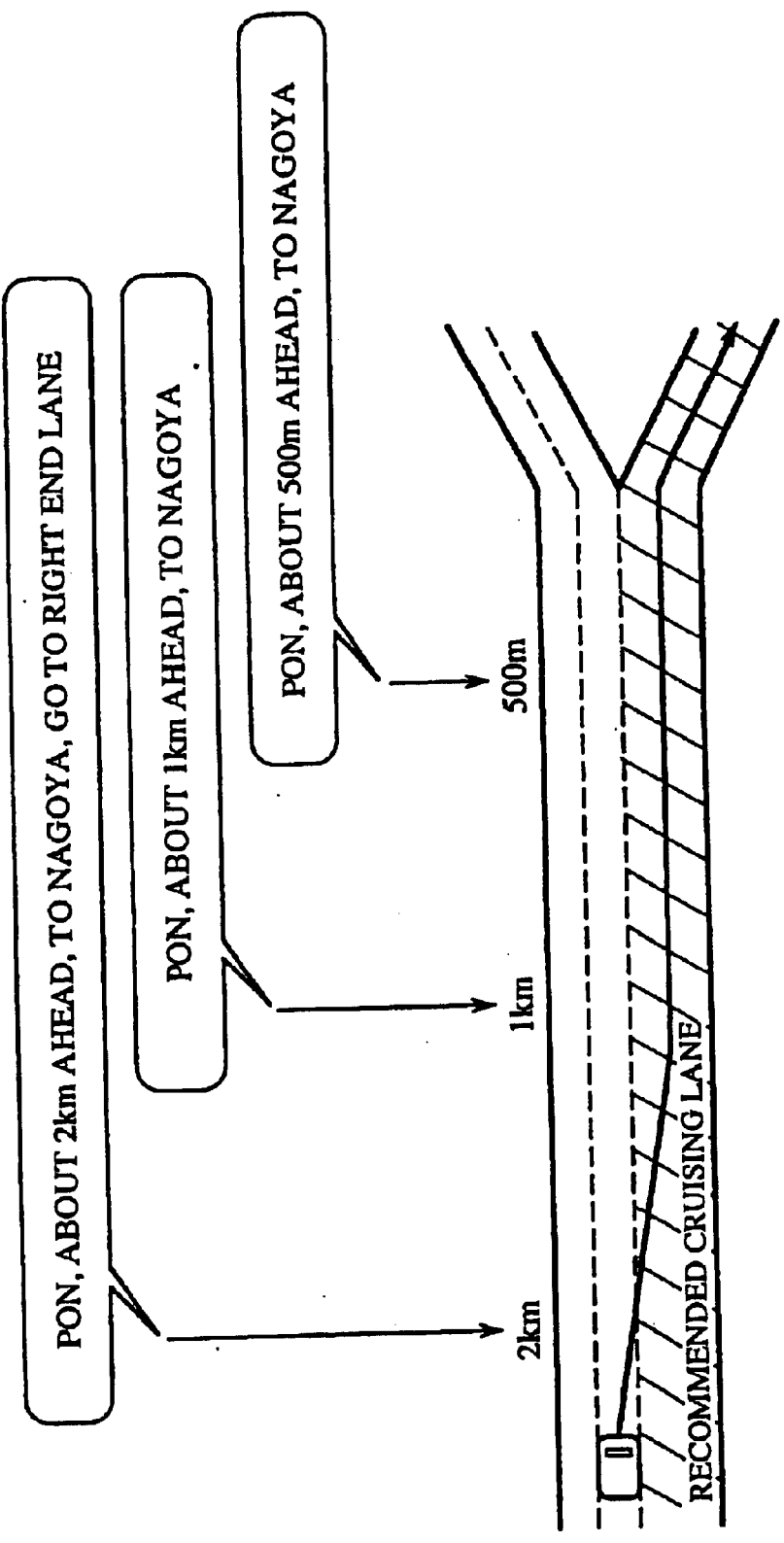
FIG. 1 is an illustration to show a destination navigation method in the prior art.
Figure 2:
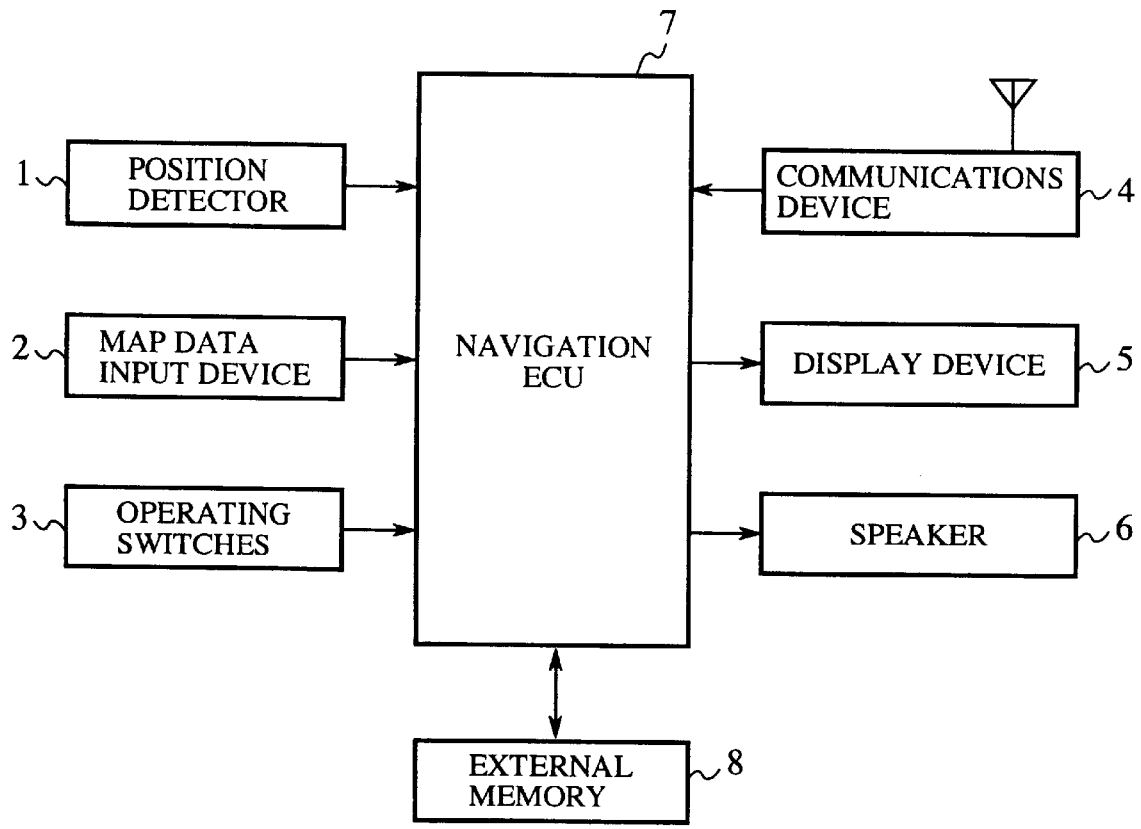
FIG. 2 is a block diagram of a navigation system using a destination navigation method in accordance with an embodiment 1 of the present invention.

FIG. 2 is a block diagram of a navigation system using a destination navigation method in accordance with the embodiment 1 of the present invention. In FIG. 2, a reference numeral 1 denotes a position detector for determining the present position of a vehicle; 2 denotes a map data input device constituted usually by a CD-ROM or a DVD as a storage medium; 3 denotes a group of operating switches; 4 denotes a communications device for performing communications with an external information center to get traffic information and the like; 5 denotes a display device for displaying a map, a menu relating to various operations and the like; 6 denotes a speaker; 7 denotes a navigation electronic control unit (Hereinafter referred to as "navigation ECU") connected to the position detector 1, the map data input device 2, the group of operating switches 3, the communications device 4, the display device 5 and the speaker 6 to perform various kinds of controls relating to a navigation system; and 8 denotes an external memory connected to the ECU 7. In this respect, the position detector 1 is constituted by a gyroscope, a speed sensor for detecting the speed of a vehicle, and a GPS receiver for a GPS for detecting the position of the vehicle on the basis of electric waves from a satellite and the like.

Figure 3:
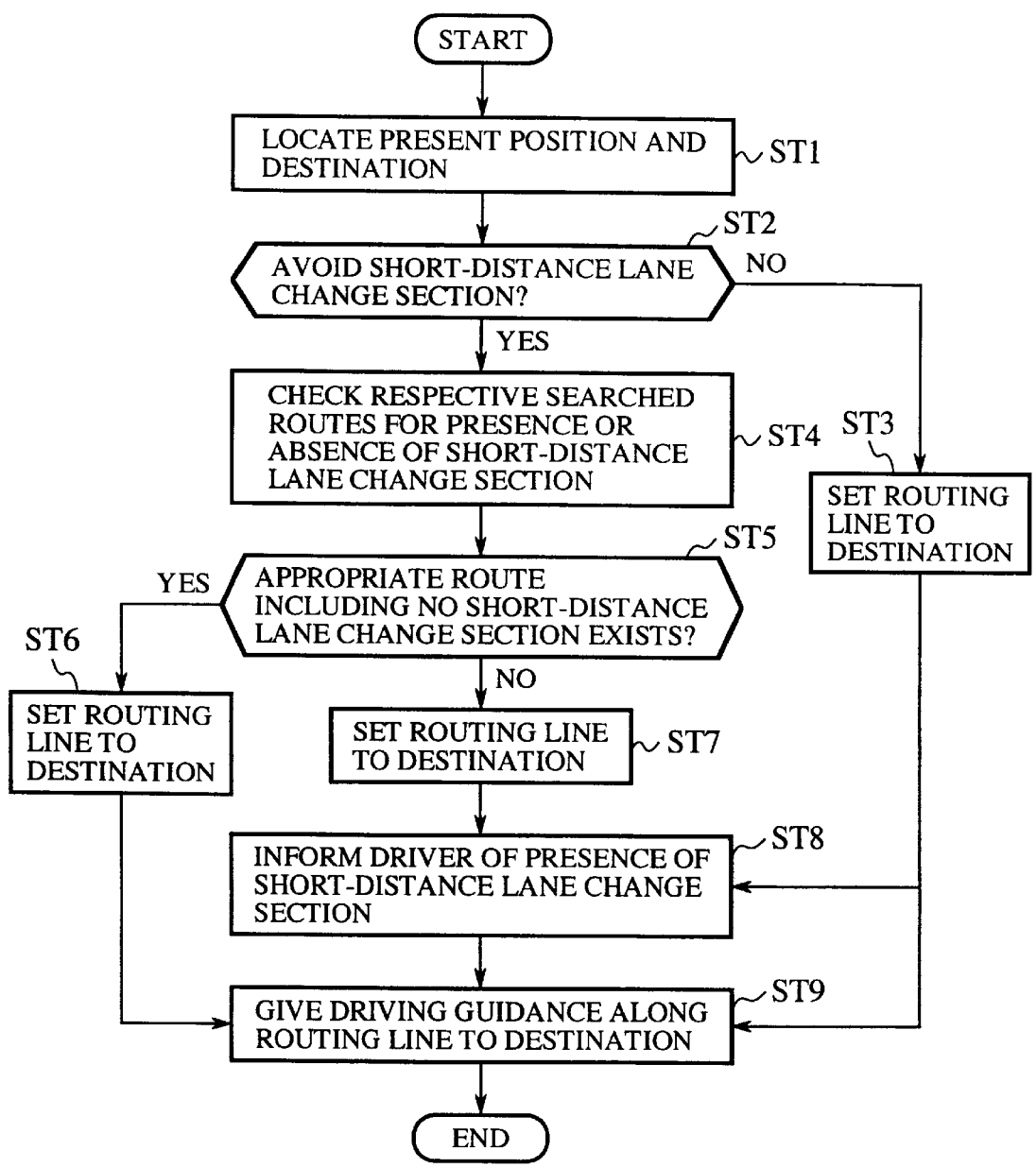
FIG. 3 is a flow chart to show a destination navigation method in accordance with the embodiment 1 of the present invention.

FIG. 3 is a flow chart to show a destination navigation method in accordance with the embodiment 1 of the present invention. After the power is turned on, at the timing when a map or a menu is displayed on the display device 5 by the navigation ECU 7 or when an instruction is given by voice from the speaker 6, a driver inputs a destination by operating the group of operating switches 3. Further, the navigation ECU 7 determines the present position of the vehicle on the basis of the data from the satellite which is obtained by a GPS receiver in the position detector 1. Thereby, the navigation ECU 7 locates the present position of the vehicle and the destination (step ST1). Next, the navigation ECU 7 inquires of the driver whether or not the driver avoids passing a short-distance lane change section by the menu displayed on the display device 5 or the like and urges the driver to select a routing line to destination (step ST2). In this respect, a criterion for judging whether or not a routing line to destination includes a short-distance lane change section, a method for setting the criterion, and a specific example of the short-distance lane change section will be described later. In the case when the driver selects to accept passing the short-distance lane change section by operating the group of operating switches 3 in response to the inquiry in the step ST2, that is, in the case when "No" is selected in the step ST2, the navigation ECU 7 performs an ordinary route search without taking into account the short-distance lane change section and selects the most appropriate route on the basis of a predetermined evaluation index or the selection of the driver and sets the route as a routing line to destination (step ST3). Herein, there may be some cases that a route including the short-distance lane change section is set as the routing line to destination, and there may be other cases that a route not including the short-distance lane change section is set as the routing line to destination. Further, in the case when the driver selects to avoid passing the short-distance lane change section, that is, "Yes" is selected in the step ST2, the navigation ECU 7 checks a presence or absence of the short-distance lane change section in performing the respective route searches and keeps a result of the presence or absence of the short-distance lane change section as attribute data for the respective searched routes (step ST4).

Next, the navigation ECU 7 judges whether or not there is an appropriate route including no short-distance lane change section (step ST5). Herein, a criterion for judging whether or not there is an appropriate route including no short-distance lane change section will be described later. Further, in the case when it is judged that there is an appropriate route/or are appropriate routes including no short-distance lane change section, that is, the result of judgment is "Yes" in the step ST5, the navigation ECU 7 selects the most appropriate route among the result on the basis of the predetermined evaluation index or the selection of the driver and sets the route as the routing line to destination (step ST6). Further, in the case when it is judged that there is no an appropriate route including no short-distance lane change, that is, the result of judgment is "No" in the step ST5, the navigation ECU 7 selects the most appropriate route among one route or a plurality of routes including the short-distance lane change section, determined in the step ST4, on the basis of the predetermined evaluation index or the selection of the driver and sets the route as the routing line to destination (step ST7). In the case when it is judged that there is no an appropriate route including no short-distance lane change section in the step ST5 and when the route including the short-distance lane change section is set as the routing line to destination in the step ST7, and in the case when it is selected to accept passing the short-distance lane change section in the step ST2 and when the route including the short-distance lane change section is set as the routing line to destination in the step ST3, the navigation ECU 7 informs the driver that there is the short-distance lane change section on the routing line to destination by means of image information such as a character and a figure displayed on the display device 5 or voice information output from the speaker 6 (step ST8). Then, the navigation ECU 7 gives the driver a driving guidance to the destination along the routing line to destination set in any one step of the step ST3, the step ST6 and the step ST7 (step ST9).

Next, the section requiring a large lane change in a short distance, that is, the short-distance lane change section will be described. First, the conditions of the route in which there is the short-distance lane change section on the routing line to destination will be described as examples. The conditions of the route include, firstly, a case when a distance for an entryway or a junction (exit way) is short to/from a highway having many lanes along the routing line to destination, secondly, a case when a distance between intersections is short on a road having many lanes, thirdly, a case when a distance between an intersection and the next U-turn point is short on a road having many lanes, and, fourthly, a case when a distance between an intersection and an entrance to a parking lot is short on a road having many lanes.

Further, in order to judge whether or not an arbitrary section on the searched route includes the short-distance lane change section, it is necessary to quantitatively define the short-distance lane change section. There are various methods for quantitatively defining the short-distance lane change section and one of them is, for example, to uniformly define the short-distance lane change section without taking into account the conditions of the road, such as "a section requiring changing four or more lanes in 100 meters irrespective of the kind of road", or "a section requiring changing five or more lanes in 50 meters for an ordinary road and three or more lanes in 200 meters for a highway". Further, a method is also thought in which a section is defined on the basis of the degree of difficulty of the lane change calculated on the basis of the equation expressed by the following equation (1).

Degree of difficulty

=A×number of lanes to be changed×speed limit/ section distance (1)

In the above equation (1), A is a coefficient set at an appropriate value to limit the degree of difficulty in an appropriate range. The degree of difficulty calculated by the equation (1) is compared with a predetermined threshold value and in the case when the degree of difficulty is larger than the predetermined threshold, it is judged that the section is the short-distance lane change section and in the case when the degree of difficulty is smaller than the predetermined threshold, it is judged that the section is not a short-distance lane change section. Here, the definition relating to the short-distance lane change section is not limited to the definition described above but a different definition may be used according to information relating to the road received by the communications device 4. Further, it is also recommendable that several alternatives are prepared for the definition relating to the short-distance lane change section and the definitions selected by the driver may be used.

Next, the evaluation index will be described which is used for selecting the most appropriate route among a plurality of routes in the step ST3, the step ST6 or the step ST7. In the case when it is not necessary to take into account whether or not the routing line to destination includes the short-distance lane change section, as in the step ST3 and the step ST6, a travel distance, a driving time, and a cruising toll are used as the evaluation indexes as is a usual case. In contrast, in the case when the most appropriate route is selected among the routes including the short-distance lane change section, as in the step ST7, it is thought that not only the above described evaluation indexes but also the degree of difficulty of the lane change calculated, for example, by the equation (1) relating to the short-distance lane change section is used as the evaluation index.

Next, performing a search for the appropriate route including no short-distance lane change section in the step ST5 will be described. In the step ST5, if there is a route for connecting the present position of the vehicle to the destination and including no short-distance lane change section, there are two following cases for the route: a case when the route is more advantageous than or equal to a route including the short-distance lane change section in the travel distance, the driving time, and the cruising toll; and a case when the route is more disadvantageous in the travel distance, the driving time, and the toll than the route including the short-distance lane change section. In the former case, it can be said that there is an appropriate route including no short-distance lane change section, but in the latter case, if the degree of disadvantage is very large, the route can not be adopted as an appropriate route, so that it is necessary to set a criterion for judging a route is an appropriate route or not. It is recommendable to set a criterion such that one value or a plurality of values among differences in the travel distance, the driving time and the cruising toll between the route to be judged and the route including the short-distance lane change section are compared with a predetermined threshold thereof and that if the value is smaller than the threshold, the route to be judged is determined as being an appropriate route, and that if the value is larger than the threshold, the route to be judged is determined as being not an appropriate route. For example, it is recommendable to set a criterion such that if the difference in the travel distance between the route to be judged and the route including the short-distance lane change section is less than 5 km, the route to be judged is determined as being an appropriate route. In this regard, for the setting of this criterion, it is also recommendable that the criterion stored beforehand in the ROM of the navigation system are uniformly used or that one of several alternatives prepared for the criterion are selected and set as the criterion by the driver.

Further, while the driving guidance to the destination along the routing line to destination is being given to the driver in the step ST9, in the case when the set routing line to destination includes the short-distance lane change section, it is preferable to give the driver by the navigation ECU 7 a driving guidance or an alarm relating to the short-distance lane change section in every time interval the vehicle comes near to the short-distance lane change section. With regard to the driving guidance or the alarm it is possible for the driver to inform of the driving guidance or the alarm by means of voice information from the speaker 6 or image information such as characters or figures displayed on the display device 5.

As described above, according to the embodiment 1, in the destination navigation method including the step ST1 of locating the present position and the destination, the step ST3 of searching routes for connecting the present position to the destination, and the step ST9 of giving the driving guidance to the destination along the routing line to destination set on the basis of the predetermined evaluation index or the selection of the driver, the improvement includes the step of judging whether or not one searched route or the plurality of searched routes include the short-distance lane change section and thus can set the routing line to destination on the basis of the presence or absence of the short-distance lane change section, so that it is possible to produce an effect of responding to the request of the driver who desires to bypass the short-distance lane change section.

Further, since the destination navigation method includes the step ST2 of making the driver select whether or not the driver avoids passing the short-distance lane change section, it is possible to reflect the driver's intention of avoiding or accepting passing the short-distance lane change section on the setting of the routing line to destination and to produce an effect of setting the routing line to destination in accordance with the driver's intention.

Further, the destination navigation method includes the step ST5 of judging whether or not one route or the plurality of routes for connecting the present position to the destination have an appropriate route including no short-distance lane change section. Thus, in the case when the driver desires to avoid passing the short-distance lane change section, if the driver finds an appropriate route including no short-distance lane change section, the driver can automatically set the route as the routing line to destination, so that it is possible to produce an effect of setting the routing line to destination that the driver desires without requiring an unnecessary selection of the driver.

Still further, the destination navigation method includes the step ST8 of informing the driver that there is the short-distance lane change section on the routing line to destination by means of the image information or the voice information in the case when the set routing line to destination includes the short-distance lane change section. Thus, the driver can recognize in advance that the driver will pass the route including the short-distance lane change section, so that it is possible to make a driver prepare for passing the route including the short-distance lane change section and to produce an effect of reducing the mental fatigue of the driver.

Still further, in the case when there is the short-distance lane change section on the routing line to destination, the destination navigation method gives the driver the alarm or the driving guidance relating to the short-distance lane change section in the step ST9 every time interval the vehicle comes near to the short-distance lane change section. Thus, it is possible to call the driver's attention before the driver passes the short-distance lane change section and to produce an effect of improving safety relating to the driving of the vehicle.

Embodiment 2

Figure 4:
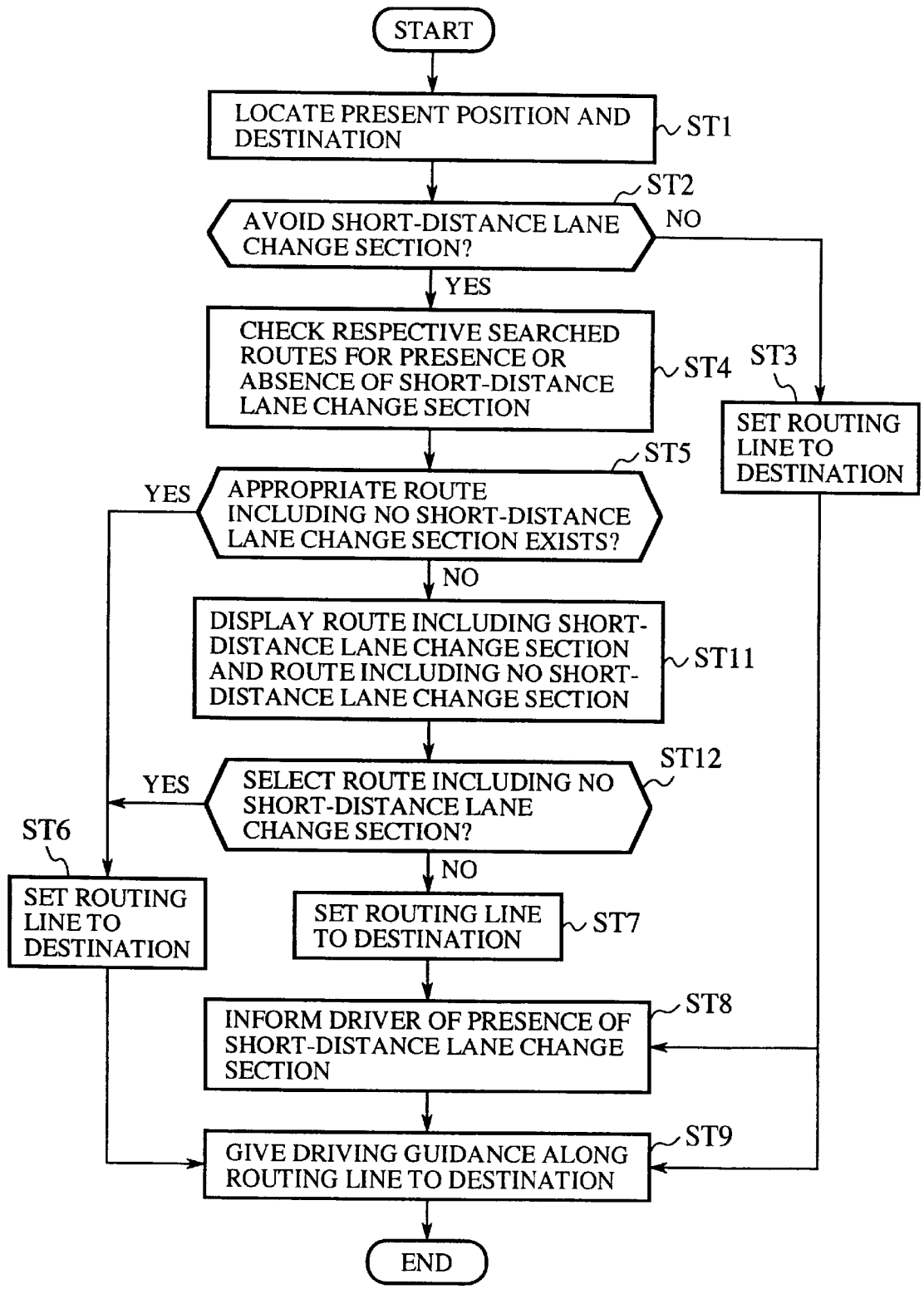
FIG. 4 is a flow chart to show a destination navigation method in accordance with an embodiment 2 of the present invention.

FIG. 4 is a flow chart to show a destination navigation method in accordance with an embodiment 2 of the present invention. In FIG. 4, the same reference numerals as in FIG. 3 denote the same or equivalent processes and the further description thereof will be omitted. In this embodiment 2, in the case when it is judged that there is no an appropriate route including no short-distance lane change route, that is, the result of judgment is "No" in the step ST5, the navigation ECU 7 displays one route or a plurality of routes including the short-distance lane change section, which is determined in the step ST4, and one route or a plurality of routes including no short-distance lane change section, which is judged to be not appropriate, on the display device 5, for example, by means of different colors in such a way that the routes can be discriminated from each other (step ST11). Next, the navigation ECU 7 makes the driver select one route out of the plurality of routes displayed on the display 5 (step ST12). If the route including no short-distance lane change section is selected, that is, "Yes" is selected in the step ST12, the selected route is set as the routing line to destination (step ST6). Or, if the route including the short-distance lane change section is selected, that is, "No" is selected in the step ST12, the selected route is set as the routing line to destination (step ST7). Here, with regard to the selection at ST12, it is also recommendable to make the driver select the kind of route, that is, the route including the short-distance lane change section or the route including no short-distance lane change section. In this case, if "Yes" is selected in the step ST12, the most appropriate route is selected among one route or the plurality of routes including no short-distance lane change section on the basis of the predetermined evaluation index and is set as the routing line to destination. Further, if "No" is selected in the step ST12, the most appropriate route is selected among one route or the plurality of routes including the short-distance lane change section on the basis of the predetermined evaluation index and is set as the routing line to destination.

As described above, this embodiment 2 can produce the same effect as the embodiment 1, and in addition to the processes of the embodiment 1, in the case when the result of judgment in the step 5 is "No", the embodiment 2 includes the step ST11 of displaying one route or the plurality of routes including the short-distance lane change section and one route or the plurality of routes including no short-distance lane change section in such a way that they can be discriminated from each other and the step ST12 of making the driver select one route out of the plurality of routes displayed in the step ST11. Thus, even in a case when it is judged the route including no short-distance lane change section is not appropriate, it is possible to set again the route as the routing line to destination by the selection of the driver and thus to produce an effect of expanding the alternatives of the driving routes and improving the convenience of the navigation system.

Embodiment 3

Figure 5:
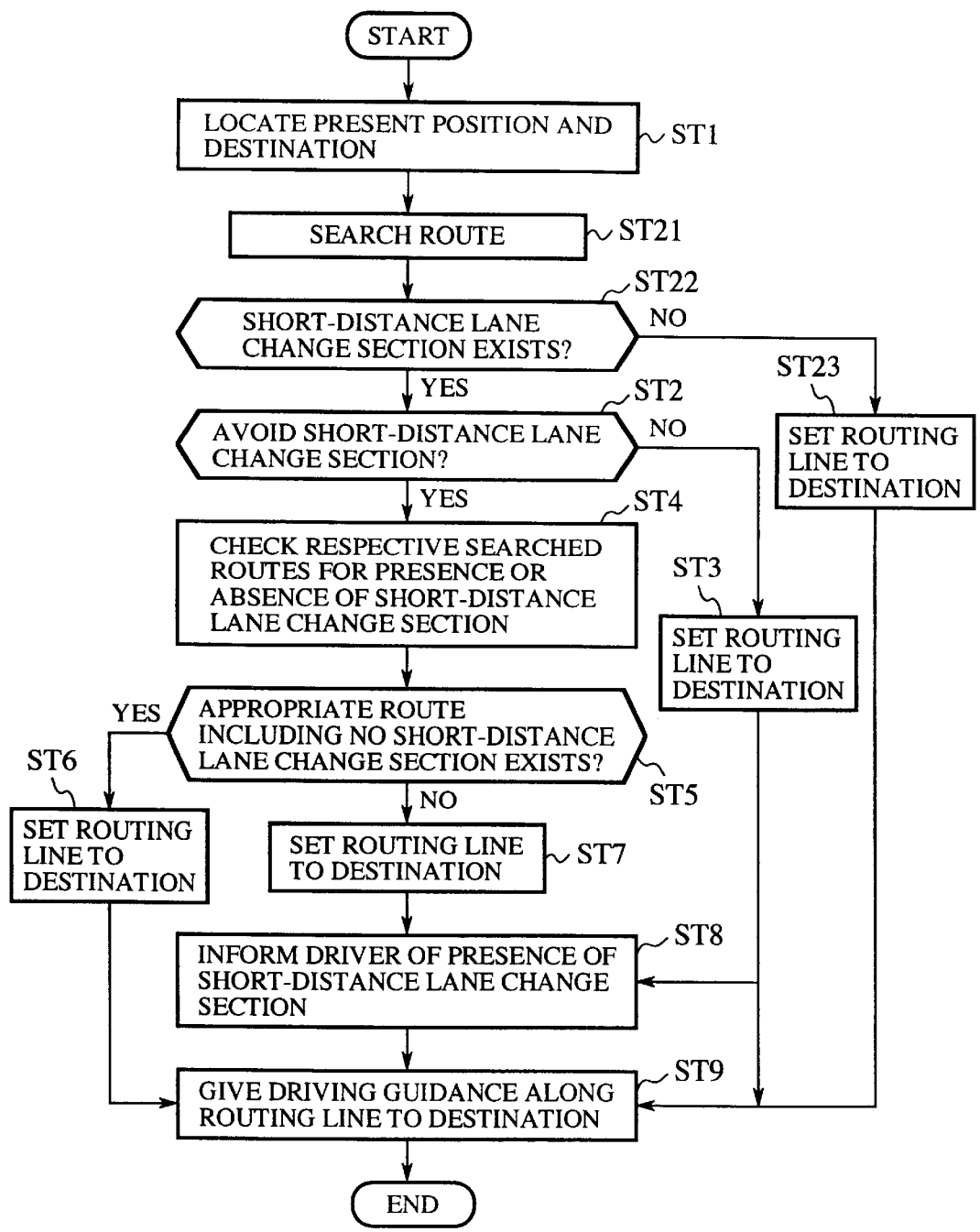
FIG. 5 is a flow chart to show a destination navigation method in accordance with an embodiment 3 of the present invention.

FIG. 5 is a flow chart to show a destination navigation method in accordance with an embodiment 3 of the present invention. The present embodiment 3 is different from the embodiment 1 in that only in a case when one route or a plurality of routes for connecting the present position to the destination include a short-distance lane change section, the driver is made to select whether or not the driver avoids passing the short-distance lane change section. In FIG. 5, the same reference numerals as in FIG. 3 denote the same or equivalent processes and the further description thereof will be omitted. In the step ST1, the navigation ECU 7 locates the present position of the vehicle and the destination and then performs a search for a route for connecting the present position to the destination (step ST21). Next, the navigation ECU 7 judges whether or not one route or a plurality of routes to be set as a routing line to destination among the routes for connecting the present position to the destination include a short-distance lane change section (step ST22). In the case when the route is judged as including no short-distance lane change section, that is, the result of judgment is "No" in the step ST22, the navigation ECU 7 selects the most appropriate route on the basis of the predetermined evaluation index or the selection of the driver and sets the route as the routing line to destination (step ST23). Further, in the case when the route is judged as including the short-distance lane change section, that is, the result of judgment is "Yes" in the step ST22, the navigation ECU 7 inquires of the driver whether or not the driver avoids passing the short-distance lane change section by means of the menu or the like displayed on the display device 5 to urge the driver to select the route (step ST2).

As described above, this embodiment 3 can produce the same effect as the embodiment 1, and in addition to the processes of the embodiment 1, the embodiment 3 includes the step ST21 of performing a search for a route for connecting the present position to the destination after the present position and the destination are located, the step ST22 of judging whether or not one route or a plurality of routes for connecting the present position to the destination include a short-distance lane change section, and the step ST2 of making the driver select whether or not the driver avoids passing the short-distance lane change section only in the case when the route is judged as including the short-distance lane change section. In this manner, only in the case when the route having a possibility of being set as the routing line to destination includes the short-distance lane change section, the driver is urged to select the route, so that it is possible to produce an effect of eliminating the need for asking an unnecessary selection of the driver and thus to improve the convenience of the navigation system.

Figure 6:
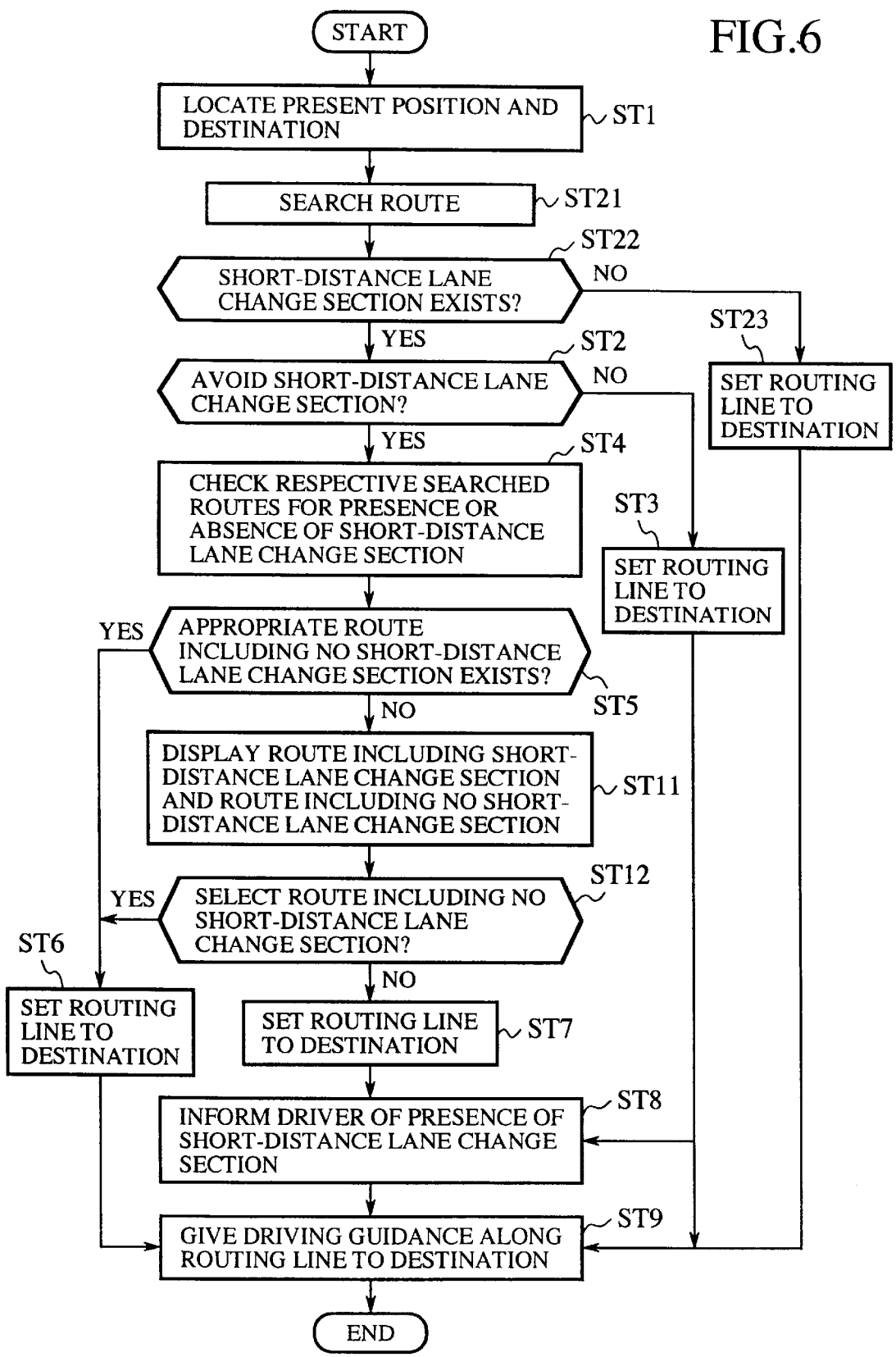
FIG. 6 is a flow chart to show a modification of the destination navigation method in accordance with the embodiment 3 of the present invention.

Further, FIG. 6 is a flow chart to show a modification of the destination navigation method in accordance with the embodiment 3 of the present invention. The same as in the case of the embodiment 2, in the modification, to the embodiment 3 are added a step ST11 of displaying one route or a plurality of routes including the short-distance lane change section and one route or a plurality of routes including no short-distance lane change section, which are judged as being not appropriate, in such a manner that they can be discriminated from each other, and a step ST12 of making the driver select one among the plurality of displayed routes. In this case, the modification of the embodiment 3 can produce the same effect as the embodiment 2, and since the driver is made to select whether or not the driver avoids passing the short-distance lane change section only in the case when the route is judged as including the short-distance lane change section, only in the case when the route having a possibility of being set as the routing line to destination includes the short-distance lane change section, the driver is urged to select the route. Therefore, it is possible to produce an effect of eliminating the need for asking an unnecessary selection of the driver and thus to improve the convenience of the navigation system.

Incidentally, it is not intended to limit the present invention to the destination navigation methods described in the embodiment 1 to the embodiment 3, but the present invention can be put into practice in various alternatives, modifications and equivalents included within the sprit and scope of the invention defined by the appended claims.

Industrial Applicability

As described above, the destination navigation method in accordance with the present invention is appropriate for guiding a route bypassing a section requiring a large lane change in a short distance in a navigation system.

What is claimed is:

1. A destination navigation method comprising the steps of:

locating a present position and a destination;

searching routes for connecting the present position to the destination;

giving a driving guidance to the destination along a routing line to the destination set on the basis of a predetermined evaluation index or a selection of a driver; and judging whether or not at least one searched route includes a short-distance lane change section by quantitatively defining said short-distance lane change section according to a length of said section.

2. The destination navigation method as claimed in claim 1, characterized by further comprising a step of making the driver select whether or not the driver avoids passing the short-distance lane change section.

3. The destination navigation method as claimed in claim 2, characterized by further comprising a step of judging whether or not the at least one route among the routes for connecting the present position to the destination includes the short-distance lane change section and a step of making the driver select whether or not the driver avoids passing the short-distance lane change section only in a case when the route is judged as including the short-distance lane change section.

4. The destination navigation method as claimed in claim 1, characterized by further comprising a step of judging whether or not at least one route for connecting the present position to the destination has an appropriate route including no short-distance lane change section.

5. The destination navigation method as claimed in claim 1, characterized by further comprising a step of informing the driver that there is the short-distance lane change section on the routing line to destination in a case when the set routing line to destination includes the short-distance lane change section, by an use of image information or voice information.

6. The destination navigation method as claimed in claim 1, characterized by further comprising a step by which the driver is given an alarm or a driving guidance relating to the short-distance lane change section every time the driver comes near to the short-distance lane change section every time the driver comes near to the short-distance lane change section in the case when the set routing line to destination includes the short-distance lane change section.

7. The destination navigation method as claimed in claim 1, displaying at least one route including a short-distance lane change section and at least one route including no short-distance lane change section in such a manner that they can be discriminated from each other, and a step of making the driver select one route out of the plurality of routes displayed in the said displaying step.

* * * * *